Figure 1:
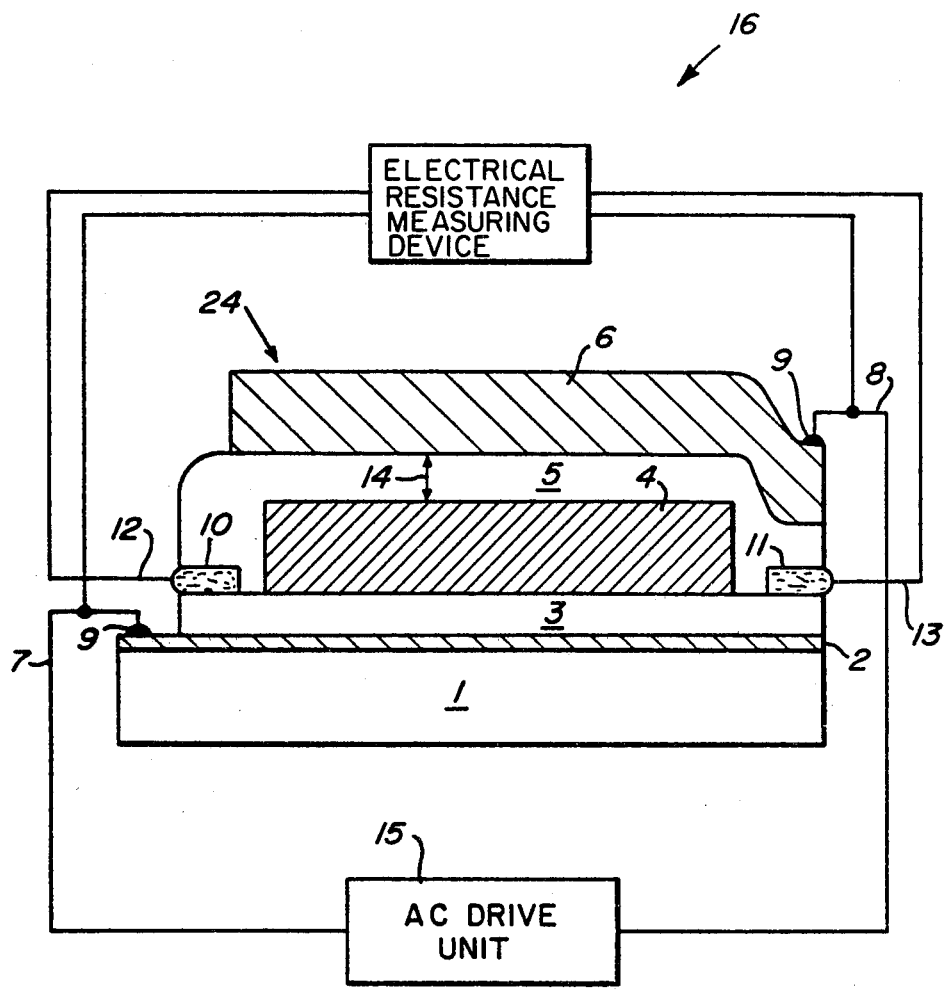

United States Patent [19]

Williams

[11] 4,447,762
[45] May 8, 1984

[54] ELECTROLUMINESCENT DISPLAYS

[75] Inventor: Edward W. Williams, Reading, England

[73] Assignee: EMI Limited, Hayes, England

[21] Appl. No.: 396,121

[22] Filed: Jul. 7, 1982

[30] Foreign Application Priority Data

Jul. 9, 1981 [GB] United Kingdom ................ 8121268

[51] Int. Cl.³ ............................................ H05B 33/08
[52] U.S. Cl. .................................... 315/116; 315/117; 315/169.3
[58] Field of Search ........................ 315/112, 114–117, 315/169.3, 246; 340/781

[56] References Cited

U.S. PATENT DOCUMENTS 2,791,723  5/1957  Magy et al. ......................... 315/115

FOREIGN PATENT DOCUMENTS 489273  1/1976  U.S.S.R. ............................... 315/246

Primary Examiner—Eugene R. LaRoche
Attorney, Agent, or Firm—Fleit, Jacobson, Cohn & Price

[57] ABSTRACT

When a display incorporating electroluminescent (EL) device is switched on, the electrical resistance across electrodes and which indicates the moisture content of the EL layer is measured by electrical resistance measuring device. If the resistance is below a preset value corresponding to an unacceptable moisture content a current pulse source is activated to heat the EL layer and evaporate the moisture. The resistance is also measured periodically during continued use of the display.

7 Claims, 2 Drawing Figures

ELECTROLUMINESCENT DISPLAYS

This invention relates to prevention of electroluminescent device property degradation arising from moisture contamination.

Electric field luminescence is a phenomenon in which a fluorescent substance emits light in response to an applied electric field. It is well known that certain electroluminescent (EL) displays incorporate an array of EL devices, each of which comprises a thin film of EL material insulated from, but sandwiched between, two electrodes. A well known problem with these devices is moisture diffusion into the thin film structure causing delamination and a general decrease in light intensity output within the moisture affected areas of the device. Complete sealing of the device can inhibit the gradual degradation of device properties, nevertheless manufacturing faults and deterioration of the seal may diminish the effectiveness of this solution.

It is an object of this invention to provide means for monitoring the moisture content of an electroluminescent device, and in response to an unacceptable moisture level, to apply heat to the device.

According to the invention there is an electroluminescent device including a number of electrically conducting electrodes, embedded in an insulating layer within said device, and means for measurement of the electrical resistance between said electrodes, including means to apply heat to the electroluminescent device in response to said electrical resistance becoming less than a preset level.

Preferably the means to apply heat comprises a source of current pulses.

The electroluminescent device may include means to deactivate the means to apply heat when the electrical resistance exceeds a predetermined value (preferably corresponding to the preset level).

Preferably the measurement means periodically checks the electrical resistance between said electrodes during continued use of the electroluminescent device.

Figure 2:
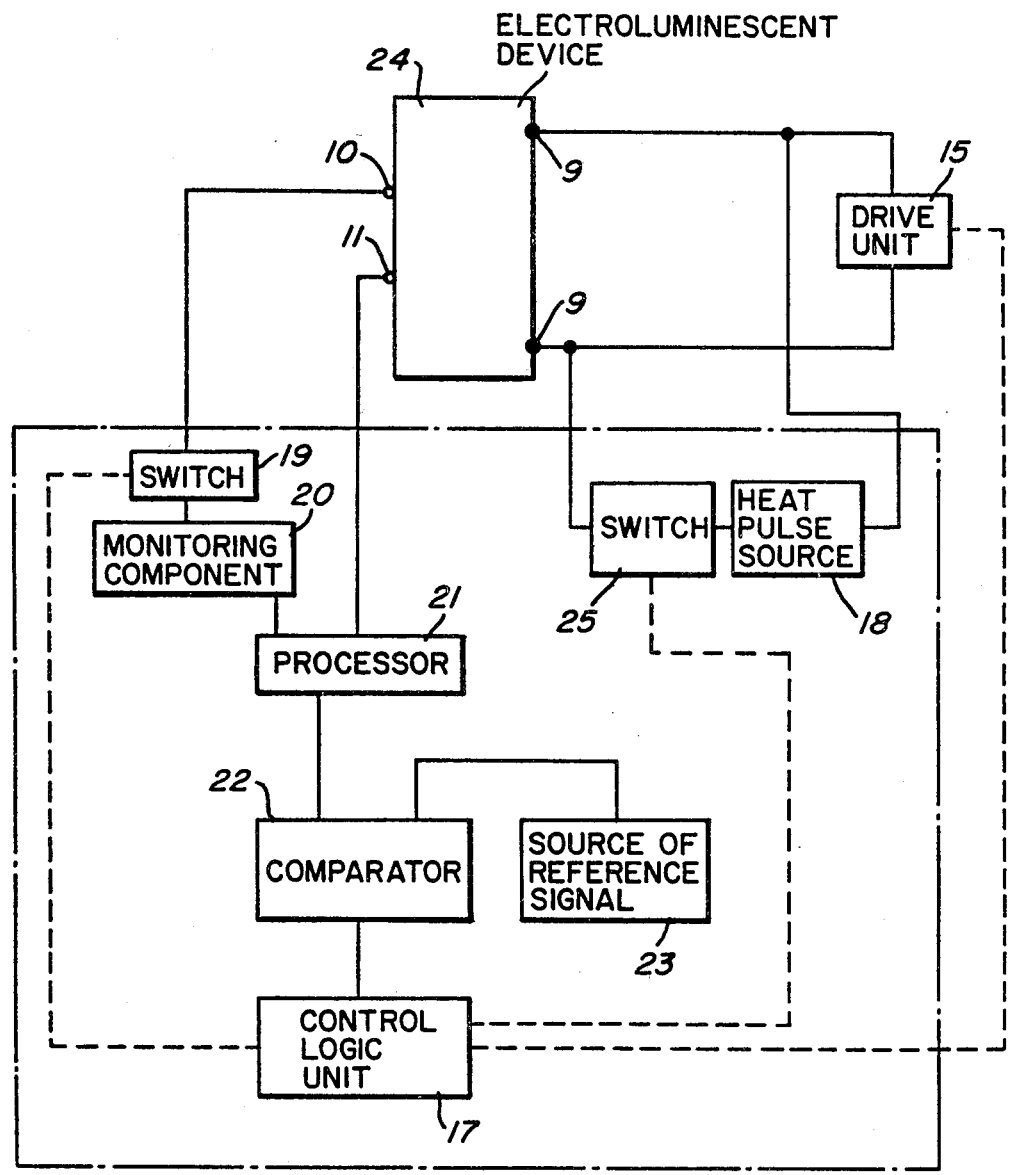

An embodiment of the invention will now be described by way of example only, with reference to and as illustrated by the accompanying drawing, in which:

FIG. 1 illustrates, partly in cross-section, an AC thin film electroluminescent device incorporating the invention; and FIG. 2 is a schematic circuit diagram of the device of FIG. 1.

A thin film 2 of tin oxide is deposited to a thickness of 2000 Å onto the 30 millimeter square surface of a 2 millimeter thick glass substrate 1, by means of vacuum deposition from an electron bombardment source.

An insulating layer 3 of yttrim oxide is deposited in a similar manner to a thickness of 3000 Å onto the tin oxide layer, allowing a 3 millimeter wide strip of tin oxide to remain exposed. In the central region of layer 3, a 6000 Å thick film of electrofluorescent manganese doped zinc sulphide 4 is vacuum deposited. Two aluminium electrodes 10 and 11, each 2000 Å thick are vacuum deposited onto layer 3, adjacent to, but not in contact with the zinc sulphide layer 4. Wires 12 and 13 may be connected to the electrodes by means of a soldered joint or any suitable electrically conducting connecting means. A further insulating film of yttrium oxide 5 is vacuum deposited onto layer 4 and layer 3, and onto electrodes 10 and 11, sufficient that a thickness of yttrium oxide of 3000 Å exists at point 14 in the figure. A rear electrode 6, comprising a layer of aluminium 4000 Å thick is vacuum evaporated onto the yttrium oxide layer 5. Wires 7 and 8 are fixed to layers 2 and 6 by means of soldered contacts 9, or other electrically conductive connecting means.

It will be understood that the dimensions and materials for the EL device disclosed hereinabove are considered optimum for the functioning of the EL device and the invention. However, they are not essential to its working and other dimensions and suitable materials may be utilized.

The wires 7 and 8 are connected to a conventional driving unit 15 for electroluminescent displays. Wires 12 and 13 are linked to an electrical resistance measuring device 16, which includes a source of current heat pulses. The electrical resistance across electrodes 10 and 11 is measured by device 16 and the value is indicative of the moisture content therebetween. A typical, but not damaging (i.e. acceptable) moisture content results in a value of electrical resistance, the value being variable according to the exact shape and thicknesses of the insulating and electroluminescent layers deposited. Typical values are $10^5$–$10^7$ ohms. As further moisture diffuses into the device, the electrical resistance decreases to a value indicative of an unacceptable level of moisture within the EL device, i.e. likely to cause damage. When this value of electrical resistance is attained, it is arranged that device 16 activates the source of current heat pulses contained therein and applies them across contacts 9. The current heat pulses cause heating within the EL device proportional to the frequency and amplitude of current heat pulses applied. The EL device will dry out as moisture is evaporated, resulting in an increase in resistances between electrodes 10 and 11. At a predetermined resistance value, it may be arranged that device 16 deactivates the source of current heat pulses, indicating an acceptable moisture level.

Detection of electrical resistance across electrodes 10 and 11 effectively monitors the moisture content of the EL device and by application of heat, the moisture content may be constrained below a maximum tolerable level, thus substantially eliminating the degradation of electroluminescent properties of the device resulting from excessive moisture absorption and hence prolonging the device lifetime.

A suitable, but not the only possible, form of device 16 is shown schematically in FIG. 2. Device 16 has a control logic unit 17 which can selectively operate drive unit 15, a heat pulse source 18 and the components 19, 20, 21, 22, 23 which monitor the moisture content of the electroluminescent device 24 (comprising layers 2 to 6 on substrate 1). More specifically, switching on a display unit (incorporating unit 15 and devices 16 and 24) activates control logic unit 17 which then operates switch 19 so as to send a reference voltage pulse V-ref from generator 21 through device 24 via terminals 10 and 11, while maintaining drive unit 15 and heat pulse source 18 inoperative. The magnitude of the resultant current detected at the input of processor 21 is dependent on the resistance between terminals 10 and 11 and thereby gives an indication of the moisture content of layer 4 of device 23. Thus this current is converted in processor 21 to a form suitable for comparison, by comparator 22, with a reference signal (from source 23) equivalent to a standard resistance of $10^5\Omega$. If the detected current has a value equivalent to a resistance above $10^5\Omega$ (i.e. the layer 4 is adequately dry) then comparator 22 sends a logic signal "0" to control logic unit 17, which thereafter sends a command signal to activate drive unit 15 thereby initiating operation of electroluminescent device 24. If, however, the current has a value equivalent to a resistance below $10^5\Omega$ (i.e. the layer 4 is excessively moist), comparator 22 sends a logic signal "1" to unit 17 which sends a signal to operate switch 25 and thereby heat pulses from source 18 are applied to device 24 to dry out layer 4 while maintaining drive unit 15 deactivated; at intervals the control unit effects the moisture monitoring operation and, once the resistance across terminals 10 and 11 is above $10^5\Omega$, it opens switch 25 to disconnect source 18 from device 24 and simultaneously activates drive unit 15.

At intervals during continuing use of the display unit, control logic unit checks the moisture content of layer 4 by de-activating drive unit 15 and repeating the moisture monitoring operation described above, and then activating heat pulse 18 or drive unit 15 as appropriate.

A display unit can have a single drive unit 15 and/or device 16 selectively connected to a number of electroluminescent devices 24; alternatively in a display unit each electroluminescent device 24 can have an individual drive unit 15 and device 16.

It will be understood that the embodiment illustrated shows an application of the invention in one form only for the purposes of illustration. In practice the invention may be applied to different types of EL devices, of devices 16, of display units or of combinations of these details of such embodiments being straightforward for those skilled in the art to implement.

What I claim is:

1. An electroluminescent device including a number of electrically conducting electrodes, embedded in an insulating layer within said device, and means for measurement of the electrical resistance between said electrodes, including means to apply heat to the electroluminescent device in response to said electrical resistance becoming less than a preset level.

2. A device according to claim 1, wherein the means to apply heat comprises a source of current pulses.

3. A device according to claim 1 which further comprises means to deactivate the means to apply heat when the electrical resistance exceeds a predetermined value.

4. A device according to claim 3, wherein the predetermined value of resistance corresponds to the preset level.

5. A device according to claim 1, wherein the measurement means periodically checks the electrical resistance between said electrodes during continuing use of the electroluminescent device.

6. A display unit incorporating at least one electroluminescent device according to claim 1.

7. A display unit incorporating a plurality of electroluminescent devices each including a number of electrically conducting electrodes embedded in an insulating layer within said device, a single means for measurement of the electrical resistance between the electrodes of each of the devices and a single means to apply heat to each of electroluminescent devices in response to said electrical resistance becoming less than a preset level.

* * * * *